United States Patent [19]

Shirotori et al.

[11] Patent Number: 5,291,114
[45] Date of Patent: Mar. 1, 1994

[54] METHOD OF AND APPARATUS FOR CONTROLLING A SHEET FEEDING MOTOR USED IN A PRINTER

[75] Inventors: Hiroshi Shirotori; Katsuhiko Nishizawa, both of Nagano, Japan

[73] Assignee: Seiko Epson Corporation, Tokyo, Japan

[21] Appl. No.: 20,122

[22] Filed: Feb. 19, 1993

[30] Foreign Application Priority Data

Apr. 17, 1992 [JP] Japan .................................. 4-98134

[51] Int. Cl.$^5$ .............................................. G06K 15/00
[52] U.S. Cl. ...................................... 318/685; 360/75; 307/41; 307/149; 318/560; 364/492
[58] Field of Search ............................... 318/560–640; 307/41, 149; 364/900; 360/75

[56] References Cited

U.S. PATENT DOCUMENTS

| | | | |
|---|---|---|---|
| 3,575,107 | 4/1971 | McDowell | 307/149 X |
| 4,306,299 | 12/1981 | Check, Jr. et al. | 364/900 |
| 5,061,957 | 10/1991 | Nishikawa et al. | 307/41 X |
| 5,189,570 | 2/1993 | Maeda et al. | 360/75 |

FOREIGN PATENT DOCUMENTS

0234264B1  4/1991  European Pat. Off. .

*Primary Examiner*—Paul Ip
*Attorney, Agent, or Firm*—Sughrue, Mion, Zinn, Macpeak & Seas

[57] ABSTRACT

The disclosed invention achieves a proper speed control of a sheet feeding motor for a serial printer that uses an astable power supply with a simple operation irrespective of variations in power supply voltage. The invention provides a method of and an apparatus for controlling the frequency of a sheet feeding pulse motor for a printer in accordance with the power supply voltage during sheet feeding. The apparatus of the invention is composed of a sheet feeding motor controller for use in a printer, the controller controlling a driving signal used to drive a motor in accordance with the level of a printer power supply voltage within the printer, the controller includes a device for detecting a power supply voltage; a first memory device for storing information representing the characteristic voltage restoration curve of the printer power supply; a second memory device for storing information representing the relationship between a rotational speed of the motor and the plurality of voltages making up the characteristic printer power supply restoration curve; a device for estimating a current power supply voltage on the characteristic restoration curve from the information stored in the first memory device; a device for reading a rotational speed from said second memory device corresponding to the current power supply voltage estimated by said estimating means; and a device for changing the speed of the motor in accordance with the read rotational speed.

6 Claims, 6 Drawing Sheets

METHOD OF AND APPARATUS FOR CONTROLLING A SHEET FEEDING MOTOR USED IN A PRINTER

BACKGROUND OF THE INVENTION

The invention relates to a sheet feeding motor controller for use in printers and the like. More particularly, the invention is directed to a method of and apparatus for maintaining constant torque of a motor used in a printer irrespective of any voltage variation in the printer's power supply.

Figure 1:
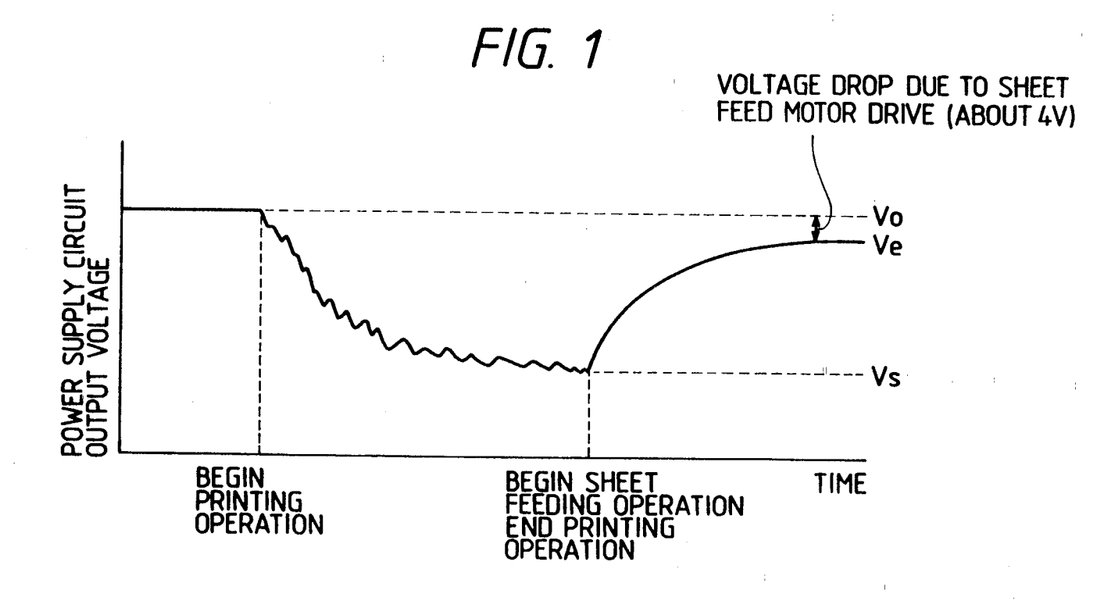
FIG. 1 is a diagram showing a variation of an output voltage of an astable power supply circuit of a printer to which the invention is applied.

Typically in serial printers, an astable power supply, such as a main secondary winding, is used as a power supply circuit. A voltage waveform, such as shown in FIG. 1, is observed as the output voltage (e.g., secondary voltage) of the power supply circuit. Upon start of a printing operation, the output voltage decreases from an initial no-load voltage $V_0$ because the printing operation consumes a relatively large amount of power. At the end of the printing operation, the output voltage takes a value $V_s$ that is comparatively lower than the no-load voltage $V_0$.

A sheet feeding operation is started almost simultaneously with the end of the printing operation. Since the power consumption during the sheet feeding operation is much smaller than the power supply capacity, the power supply can restore its output voltage level in accordance with an exponential curve characteristic of the power supply used. The restored voltage stabilizes at a voltage $V_e$, which represents a difference between the no-load voltage $V_0$ and the voltage drop due to driving the sheet feeding motor (e.g., 4 V due mainly to loss at a transformer). The voltage drop incurred during the printing process cyclically alternates with the voltage restoration (increase) during the sheet feeding process until the printing process is ultimately terminated.

The sheet feeding process requires accurate control over the sheet feeding amount, as well as the proper motor torque for proper sheet feeding. To meet such requirements, pulse motors are generally employed because they can control the sheet feeding amount easily and accurately. Pulse motors have the characteristic that a constant output torque can be maintained by controlling the rotational speed in proportion to a variation in the power supply voltage (if any).

A serial printer using an astable power supply therefore must control the rotational speed of a sheet feeding pulse motor. This control is typically performed by controlling the interval between the driving pulses used to control the pulse motor (i.e., controlling the pulse frequency). This control is made in accordance with the restoration curve of the power supply output voltage. However, the sheet feeding process involves a plurality of operations such as accelerating the pulse motor, driving the pulse motor at a constant torque, and decelerating the pulse motor. The speed of the sheet feeding pulse motor must therefore be controlled taking into account the restoration curve of the power supply output voltage with respect to each of these operations so that the best control can be implemented.

To achieve such a speed control, there is known a method of determining a proper speed (i.e., determining the interval between the pulses supplied to the pulse motor) by checking the output voltage of the power supply circuit every time the sheet feeding pulse motor is rotated for each operation.

This conventional method is excellent in achieving accurate torque control, but imposes the problem of overloading the arithmetic and logic circuits of the printer due to the complicated processing involved in calculating optimal speeds while checking the voltage during each operation.

SUMMARY OF THE INVENTION

Accordingly, the object of the invention is to provide simple and proper speed control of a sheet feeding motor of a printer using an astable power supply.

The invention provides an apparatus for controlling the time interval between driving pulses of the sheet feeding pulse motor of the printer in accordance with the power supply voltage during the sheet feeding operation. The apparatus of the invention includes a sheet feeding motor controller for use in a printer, the controller controlling a driving signal used to drive a motor in accordance with the level of a printer power supply voltage within the printer, the controller comprising means for detecting a power supply voltage; a first memory device for storing information representing the characteristic restoration curve of the printer power supply voltage; a second memory device for storing information representing the relationship between a rotational speed of the motor and the plurality of voltages making up the characteristic printer power supply restoration curve; means for estimating a current power supply voltage on the characteristic restoration curve from the information stored in the first memory device; means for reading a rotational speed from said second memory device corresponding to the current power supply voltage estimated by said estimating means; and means for changing the speed of the motor in accordance with the read rotational speed.

In operation, a power supply voltage is detected at the start of the sheet feeding operation. Current power supply voltages at various periods of time during the sheet feeding operation are estimated from the initial sheet feeding power supply voltage detected, the time that has elapsed from the start of the sheet feeding operation, and the power supply voltage restoration curve information stored in the first memory device. A time interval between driving pulses corresponding to one of the estimated current power supply voltages is read from the second memory device so that a sheet feeding pulse motor is driven with a pulse driving signal in accordance with the read time interval (i.e., an appropriate driving pulse frequency).

The above and other objects, features, and advantages of the invention are disclosed as is apparent from the following description of preferred embodiments.

DETAILED DESCRIPTION OF THE PREFERRED EMBODIMENTS

Figure 2:
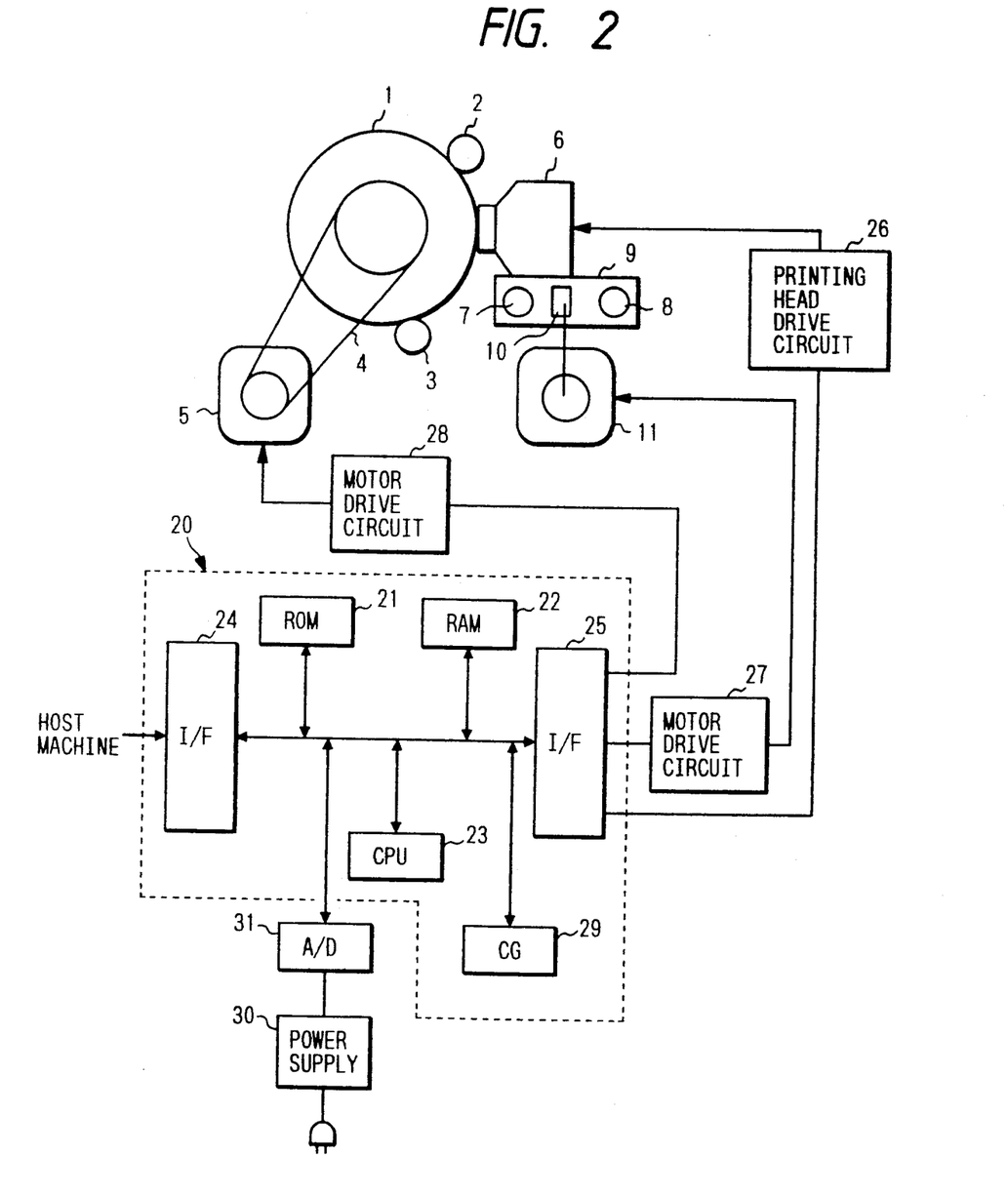
FIG. 2 is a block diagram showing the general configuration of an embodiment of the invention.

In FIG. 2, a platen roller 1 supports a printing (recording) sheet (not shown) on its surface in cooperation with sheet biasing rollers 2, 3 that apply a predetermined pressure on the sheet. The platen roller 1 is rotated by a sheet feeding pulse motor 5 to forward the sheet vertically through a preset distance. The motor 5 is coupled to the platen roller 1 through a transmission mechanism 4, which operates to rotate the roller 1 in response to rotation of the motor 5.

A printing (recording) head 6 is fixed on a carriage 9 that is movably mounted on guide members 7, 8. The carriage 9 is moved by a pulse motor 11 to slide the printing head 6 across the width of the sheet. The motor 11 is coupled to the carriage 9 through a timing belt 10, which operates to move the carriage 9 in response to rotation of the motor 11.

The printing head 6, the carriage driving pulse motor 11, and the sheet feeding pulse motor 5 are connected to drive circuits 26, 27, and 28, respectively. These drive circuits 26, 27, and 28 receive control signals from a control circuit 20.

In the preferred embodiment, the control circuit 20 is composed of a microcomputer that includes: a read-only memory (ROM) 21; a random-access memory (RAM) 22; a central processing unit (CPU) 23; interface circuits 24, 25; and a character generator 29. The ROM 21 stores information in the form of various tables (Tables 1 to 4), in addition to operation programs of the CPU 23. The interface circuit 24 receives print instructions from an external host machine (not shown), such as a personal computer, and the interface circuit 25 relays control signals from the CPU 23 to the drive circuits 26, 27, and 28. The character generator 29 converts character code data contained in each print instruction received from the host machine into bit-map data or the like.

A power supply circuit 30 provides operating power to all of the components of the serial printer. The power supply circuit is astable and thus the output voltage of the circuit 30 varies with minutely changing load conditions. The output voltage of the power supply circuit 30 is fed to the control circuit 20 while sampled and converted to digital data by an analog-to-digital (A/D) converter 31.

Figure 3:
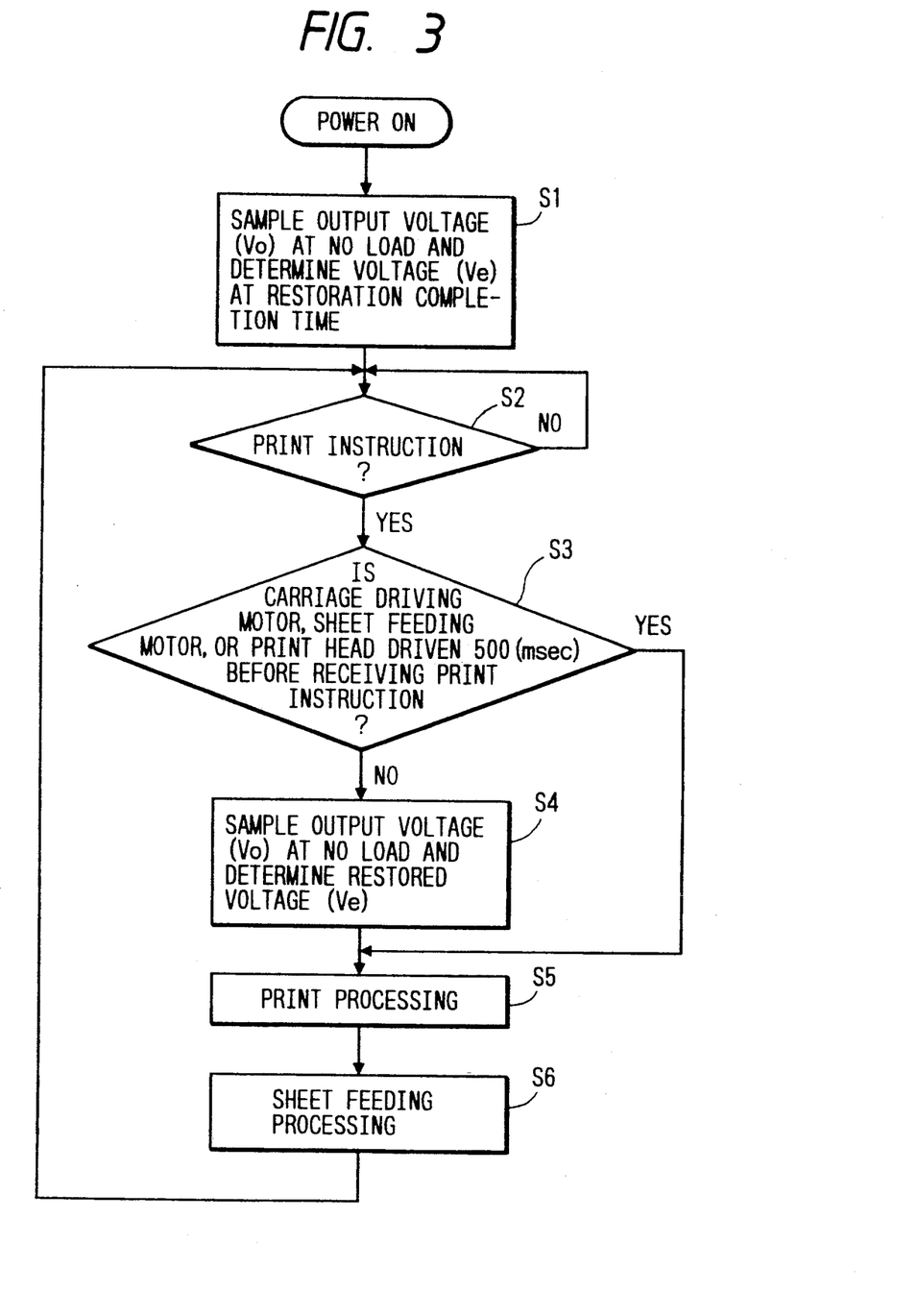
FIG. 3 is a flowchart showing the general processing of a microcomputer in the embodiment shown in FIG. 2.

FIG. 3 shows the general flow of the processing executed by the CPU 23 of the control circuit 20 in accordance with the present invention.

When the power of the printer is turned ON, an output voltage $V_0$ of the power supply circuit 30 at a "no-load" condition is sampled by the A/D converter 31 (S1). (The voltage $V_0$ (FIG. 1) will hereinafter be referred to as the "no-load voltage," and may be any common value such as 45 V.) A predetermined voltage drop (e.g., 4 V) attributed to the sheet feeding motor as a load is subtracted from the no-load voltage $V_0$, and the resulting voltage difference is stored in RAM 22 as an estimated power supply output voltage $V_e$ (S1). When the output voltage has been restored completely during a subsequent sheet feeding operation the output voltage should be restored to this estimated voltage level. (See FIG. 1.) (This estimated output voltage $V_e$ will hereinafter be referred to as the "restored voltage.") The CPU 23 then waits for the arrival of a print instruction from the external host machine (S2).

Upon reception of a print instruction, the CPU 23 (S3) checks whether the carriage driving motor 11, the sheet feeding motor 5, or the print head 6 had been driven within the last, e.g., 500 ms (the time required for the output voltage to stabilize after the power supply circuit 30 has been switched from the load to the no-load state). If none of the elements had been driven, the power supply circuit 30 is detected as being in the no-load state at the current time with the output voltage being stable. In that case, the current no-load voltage $V_0 i$ sampled by the A/D converter 31, and a restored voltage $V_e$ is estimated again in the same manner as in Step S1 based on the current voltage $V_0$. Based on this estimation, the restored voltage $V_e$ is updated in RAM 22 (S4). On the other hand, if any of the three elements had been driven, the output voltage cannot be considered stable at the current time. Therefore, the last stored estimated value $V_e$ is not changed (i.e., Step S4 is bypassed).

In Step S5, the received print instruction is decoded and a printing operation for a single line is performed according to the decoded data. After the line is completed, the sheet feeding operation is performed to advance the sheet one line (S6). Then the CPU 23 checks whether or not there are any nonprocessed print instructions (S2) and, if there are, the steps S3 to S6 are repeated.

The above-described printing and sheet feeding operations are alternately performed for each line to be printed in accordance with the print instructions received by CPU 23. If, at any time, the no-load state lasts 500 ms or more prior to a start of the printing operation, the latest no-load voltage $V_0$ is sampled before the start of the printing operation to thereby estimate the restored voltage $V_e$. As will be described below, the estimated restored voltage $V_e$ is used to control the speed of the sheet feeding motor 5 during the sheet feeding operation (S6).

Figure 4:
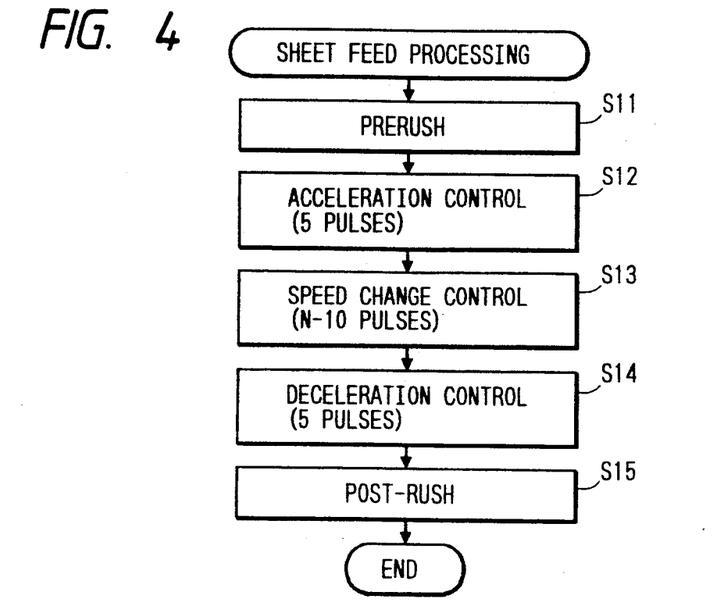
FIG. 4 is a flowchart showing the sheet feeding operation of FIG. 3.

FIG. 4 is a flowchart showing in more detail the sheet feeding operation S6 of FIG. 3.

The sheet feeding operation includes five sub-operations: pre-rush (S11); acceleration control (S12); speed change control (S13); deceleration control (S14); and post-rush (S15).

Before the start of the sheet feeding operation, a pre-rush operation (S11) is executed to accurately position the sheet feeding motor 5. In particular, before changing the frequency of the driving pulse signal used to control the sheet feeding motor 5, the motor is energized for a short period of time, e.g., 3 ms, with the current frequency of the driving pulse signal as output by the motor drive circuit 28.

After the pre-rush operation, the CPU 23 carries out the acceleration control operation (S12). In acceleration control, an output voltage at the start of the sheet feeding operation (hereinafter referred to as the "start voltage $V_1$," FIG. 1) is detected, and a degree to which the motor 5 is accelerated is selected. As a result, the sheet feeding motor 5 is accelerated according to the selection.

After acceleration control, the CPU 23 executes the speed change control operation (S13).

In speed change control, the restoration level of the output voltage is estimated based on the start voltage $V_s$ so that a torque required for sheet feeding under the estimated restoration level can be provided.

After the speed change control operation, the CPU 23 starts the deceleration control operation (S14). In deceleration control, a degree to which the sheet feeding motor 5 is decelerated is selected based on the output voltage estimated during the speed change control operation, and the sheet feeding motor 5 is decelerated according to the selection. After the deceleration control operation, the post-rush operation (S15) is executed to bring the sheet feeding motor 5 to a complete stop. The post-rush operation ensures a complete stop of the sheet feeding motor 5 by energizing the motor for, e.g., 20 ms, using the last frequency of the pulse driving signal output by the drive circuit 28. However, the motor drive circuit may repetitively output a signal for, e.g., 2 ms and terminate the signal for, e.g., 4 ms for a number of times (e.g., 4), instead of energizing the motor for 20 ms. This latter method is advantageous in keeping the sheet feeding motor 5 from overheating.

Both the acceleration control operation and the deceleration control operation are effected by the number of stages, e.g., five stages, used to control the sheet feeding motor 5 independently of the sheet feeding distance. Hence, the speed change control operation is effected by the number of stages, which is the number obtained by subtracting the number of stages in both the acceleration control and the deceleration control operation from the sheet feeding distance, i.e., by N-10, assuming that the sheet feeding distance is equal to N.

However, if $N \leq 10$, the sheet is fed at a constant speed corresponding to the time interval between pulses (i.e., frequency) of a driving pulse signal of the motor 5 without undergoing the operations of acceleration, speed change, and deceleration control.

Figure 5:
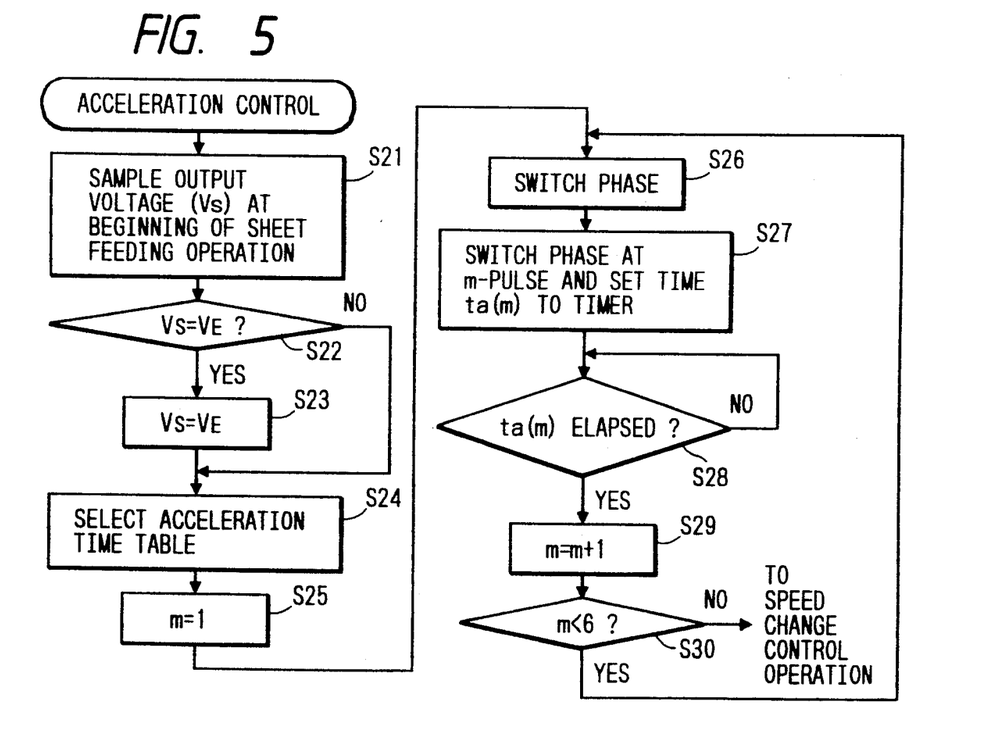
FIG. 5 is a flowchart showing the acceleration control operation of FIG. 4.

FIG. 5 is a flowchart showing the acceleration control operation (S12 in FIG. 4) in detail.

A start voltage $V_s$ is sampled by the A/D converter 31 (S21). Then, the start voltage $V_s$ is compared with a restored voltage $V_e$ which was previously stored (S22). If $V_s > V_e$, the start voltage $V_s$ is changed to a value equal to the restored voltage $V_e$ (S23).

The CPU 23 accesses an acceleration time table stored in the ROM 21 (S24). The acceleration time table is shown in Table 1 (below). In the acceleration time table, all possible start voltages $V_s$ are divided into four ranges, and the time period between pulses of the pulse driving signal (ta (1) to ta (5)) corresponding to the five stages used in the acceleration control operation are defined on a range basis. In Step S24, the appropriate one of the time intervals ta (1) to ta (5) corresponding to the start voltage $V_s$ read in Step S21 (or changed Step S23) is selected, as will be described in detail below.

TABLE 1

| Output voltage at sheet feed start (V) | $V_s \leq 28$ | $28 < V_s \leq 33$ | $33 < V_s \leq 38$ | $38 < V_s$ |
|---|---|---|---|---|
| ta (1) | 3.70 | 3.60 | 3.10 | 2.80 |
| ta (2) | 2.80 | 2.70 | 2.60 | 2.40 |
| ta (3) | 2.80 | 2.70 | 2.30 | 2.00 |
| ta (4) | 2.80 | 2.60 | 2.10 | 1.70 |
| ta (5) | 2.80 | 2.60 | 2.00 | 1.60 |

The time interval ta (1) to ta (5) in each range of the acceleration time table are determined prior to operation of the printer in the following fashion.

As described above, the acceleration control operation is executed with only five stages. Since a period involved in the five stages is so short compared with the time required for restoring the output voltage, the restored output voltage in that period is negligible. That is, the output voltage can be deemed equal to the start voltage $V_s$ during the acceleration control operation. With the output voltage deemed as such, the time intervals ta (1) to ta (5) are determined as degrees to which the motor 5 is to be accelerated within the five-stage period of the acceleration control operation so that the motor 5 is accelerated to a start speed at the start of the speed change control operation (described below).

Alternatively, the voltages $V_s$ in Table 1 (above) could be divided into smaller ranges of, e.g., 1 V, like those used in the speed control operation (described below). However, such an alternative requires a large memory capacity and does not provide a significant advantage. Thus, in the preferred embodiment, the start voltage $V_s$ is divided into four ranges as shown in Table 1. This arrangement is more practical and produces satisfactory results.

When one of the time intervals ta (1) to ta (5) has been read in Step S24, a stage count m is set to 1 (S25). Then, the frequencies of the driving pulse-signal of the sheet feeding motor 5 is changed (S26), and a timer is started simultaneously by setting the timer to ta (m), which is the time interval of an mth stage (S27). Upon elapse of the time interval ta (m) as detected by the timer (S28), the stage count m is incremented (S29). The CPU 23 then checks whether or not m is equal to 6 (S30). If m is less than 6, the operations from Steps S26 to S30 are repeated. Accordingly, the phase of the sheet feeding motor 5 is switched for every one of the read time intervals ta (1) to ta (5), thereby increasing the speed of the sheet feeding motor 5.

Figure 6:
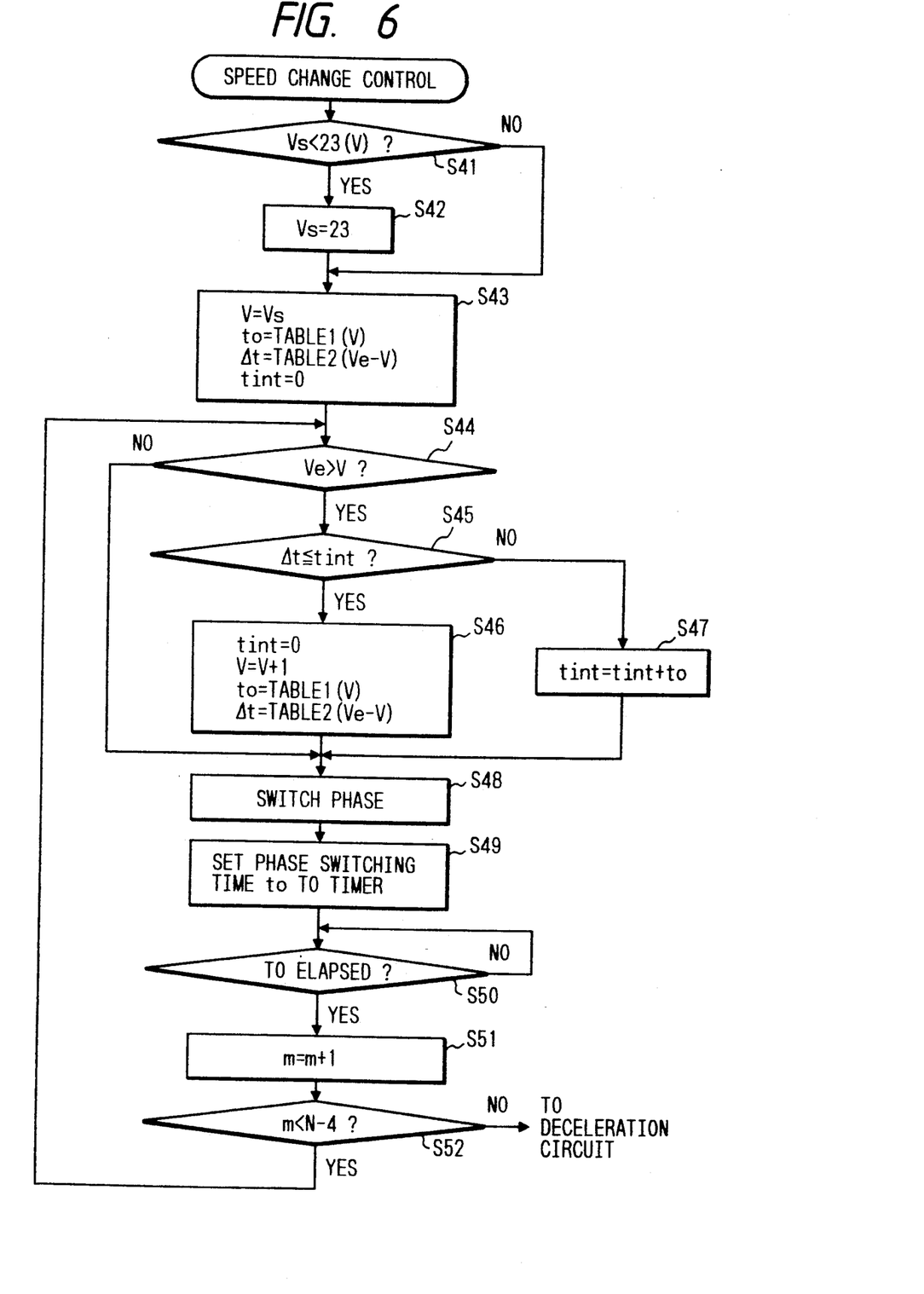
FIG. 6 is a flowchart showing the speed change control operation of FIG. 4.

When the stage count m has reached 6, the acceleration control operation is terminated and the speed change control operation begins. FIG. 6 shows the speed change control operation in detail.

First, the CPU 23 checks whether or not the start voltage $V_s$ detected at the start of the acceleration control operation (S21) is less than the minimum voltage required for driving the printer, e.g., 23 V (S41). If $V_s < 23$ V, then it is deemed that the start voltage $V_s = 23$ V (S42).

Then, assuming that the output voltage V at the current time (hereinafter referred to as the "current voltage") is equal to the start voltage $V_s$, a time interval $t_0$ corresponding to such current voltage V is read from a speed change time table (referred to as a function "TABLE1 (V)" in FIG. 6) within the ROM 21 (S43). The speed change time table is such as shown in Table 2 (below), in which all the possible current voltages V are set forth in ranges of 1 V from 23 V to 46 V with the time interval $t_0$ corresponding to each range. Each time interval $t_0$ set therein is such that a motor speed producing the predetermined torque required for sheet feeding can be attained at each corresponding voltage.

TABLE 2

| V (V) | $t_0$ (ms) |
|---|---|
| $23 \leq V < 24$ | 2.70 |
| $24 \leq V < 25$ | 2.70 |
| $25 \leq V < 26$ | 2.70 |
| $26 \leq V < 27$ | 2.70 |
| $27 \leq V < 28$ | 2.70 |
| $28 \leq V < 29$ | 2.51 |
| $29 \leq V < 30$ | 2.35 |
| $30 \leq V < 31$ | 2.20 |
| $31 \leq V < 32$ | 2.07 |
| $32 \leq V < 33$ | 1.96 |
| $33 \leq V < 34$ | 1.86 |
| $34 \leq V < 35$ | 1.77 |

TABLE 2-continued

| V (V) | $t_0$ (ms) |
|---|---|
| $35 \leq V < 36$ | 1.68 |
| $36 \leq V < 37$ | 1.61 |
| $37 \leq V < 38$ | 1.54 |
| $38 \leq V < 39$ | 1.47 |
| $39 \leq V < 40$ | 1.41 |
| $40 \leq V < 41$ | 1.36 |
| $41 \leq V < 42$ | 1.31 |
| $42 \leq V < 43$ | 1.26 |
| $43 \leq V < 44$ | 1.22 |
| $44 \leq V < 45$ | 1.18 |
| $45 \leq V < 46$ | 1.14 |
| $46 \leq V$ | 1.11 |

Then, a difference ($V_e - V$) between the already estimated restored voltage $V_e$ and the current voltage V is obtained, and a time $\Delta t$ corresponding to the voltage difference $V_e - V$ is read from a restoration time table (referred to as a function "TABLE 2 ($V_e - V$)" in FIG. 6) within the ROM 21 (S43). The restoration time table is as shown in Table 3 (below), in which all the possible voltage differences ($V_e - V$) are divided into ranges of 1 V from approximately 0 V to 23 V, together with times $\Delta t$ (hereinafter referred to as a "unit restoration time") required for the corresponding voltages in each range to restore 1 V of output voltage. Each time entry $\Delta t$ is determined prior to operation of the printer based on a time constant of the already identified characteristic output voltage restoration curve and the corresponding voltage difference $V_e - V$ entry.

Furthermore, a time ($t_{int}$), which represents time elapsed from the start of the speed change control operation, is set to 0 (S43).

TABLE 3

| $V_e - V$ (V) | $\Delta t$ (ms) |
|---|---|
| $V_e - V \leq 1$ | 62.38 |
| $1 < V_e - V \leq 2$ | 38.49 |
| $2 < V_e - V \leq 3$ | 25.89 |
| $3 < V_e - V \leq 4$ | 20.08 |
| $4 < V_e - V \leq 5$ | 16.41 |
| $5 < V_e - V \leq 6$ | 13.87 |
| $6 < V_e - V \leq 7$ | 12.01 |
| $7 < V_e - V \leq 8$ | 10.60 |
| $8 < V_e - V \leq 9$ | 9.48 |
| $9 < V_e - V \leq 10$ | 8.58 |
| $10 < V_e - V \leq 11$ | 7.83 |
| $11 < V_e - V \leq 12$ | 7.20 |
| $12 < V_e - V \leq 13$ | 6.67 |
| $13 < V_e - V \leq 14$ | 6.21 |
| $14 < V_e - V \leq 15$ | 5.81 |
| $15 < V_e - V \leq 16$ | 5.46 |
| $16 < V_e - V \leq 17$ | 5.14 |
| $17 < V_e - V \leq 18$ | 4.87 |
| $18 < V_e - V \leq 19$ | 4.62 |
| $19 < V_e - V \leq 20$ | 4.39 |
| $20 < V_e - V \leq 21$ | 4.19 |
| $21 < V_e - V \leq 22$ | 4.00 |
| $22 < V_e - V$ | 3.83 |

Then, CPU 23 checks whether or not the current voltage V has reached the restored voltage $V_e$ (S44). If not, the CPU 23 checks whether or not the time $t_{int}$ that has elapsed has reached the unit restoration time $\Delta t$ (S45).

If the time that has elapsed $t_{int}$ has not reached the unit restoration time $\Delta t$ read out of Table 3, the current voltage V has not yet been restored to a value 1 V higher than the previously obtained value. In that case, the time that has elapsed $t_{int}$ is updated by adding thereto the time interval $t_0$ (S47) in order to drive the sheet feeding motor 5 in accordance with the time interval $t_0$ previously read from the speed change time table (Table 2).

The CPU 23 then controls the frequency change of the driving pulse signal of the motor 5 (S48) and simultaneously activates the timer by setting the time interval $t_0$. Then, the CPU 23 checks whether or not the time interval $t_0$ has elapsed (S50). If the time interval $t_0$ has elapsed, the stage count m is incremented (S51). In Step S52, the CPU 23 checks whether or not the stage count m has reached a stage number N-4, which represents the step at the end of the speed change operation. If not, the CPU 23 executes Step S44, as described above.

Frequency change of the driving pulse signal for the sheet feeding motor 5 is repeated in accordance with the previously read time interval $t_0$ until the time that has elapsed $t_{int}$ reaches the unit restoration time $\Delta t$ (S44, S45, S47, S48 to S52).

The fact that the time that has elapsed $t_{int}$ has reached the unit restoration time $\Delta t$ (S45) indicates that the current voltage V has been restored to a level 1 V higher than the previously obtained value. In that case, the CPU 23 executes Step S46 to select a new time interval $t_0$ based on the restored, new current voltage V.

In Step S46, the CPU 23 resets the time that has elapsed $t_{int}$ to 0, updates the current voltage V to a value 1 V higher than the previous value, reads a new time interval $t_0$ corresponding to the updated current voltage V from the speed change time table (Table 2), calculates the voltage difference $V_e - V$ between the restored voltage $V_e$ and the updated current voltage V, and reads a new unit restoration time $\Delta t$ corresponding to the voltage difference from the restoration time table (Table 3).

Frequency change of the driving pulse signal for the sheet feeding motor 5 is repeated again in accordance with the new read time interval $t_0$ until the time that has elapsed $t_{int}$ reaches the unit restoration time $\Delta t$ (S44, S45, S47, S48 to S52).

The speed change control operation continues by repeating the Steps S44 to S52. In summary, the operation involves the steps of: reading from the restoration time table an estimated output voltage that is being restored (Table 3); reading a time interval for the driving pulse signal that would allow a predetermined torque required for sheet feeding at the read estimated output voltage from the speed change table (Table 2); and driving the sheet feeding motor 5 using a driving pulse signal having the read time interval between pulses.

When the step count m reaches step number N-4 (representing the end of the speed change control operation), the CPU 23 begins execution of the deceleration control operation.

Figure 7:
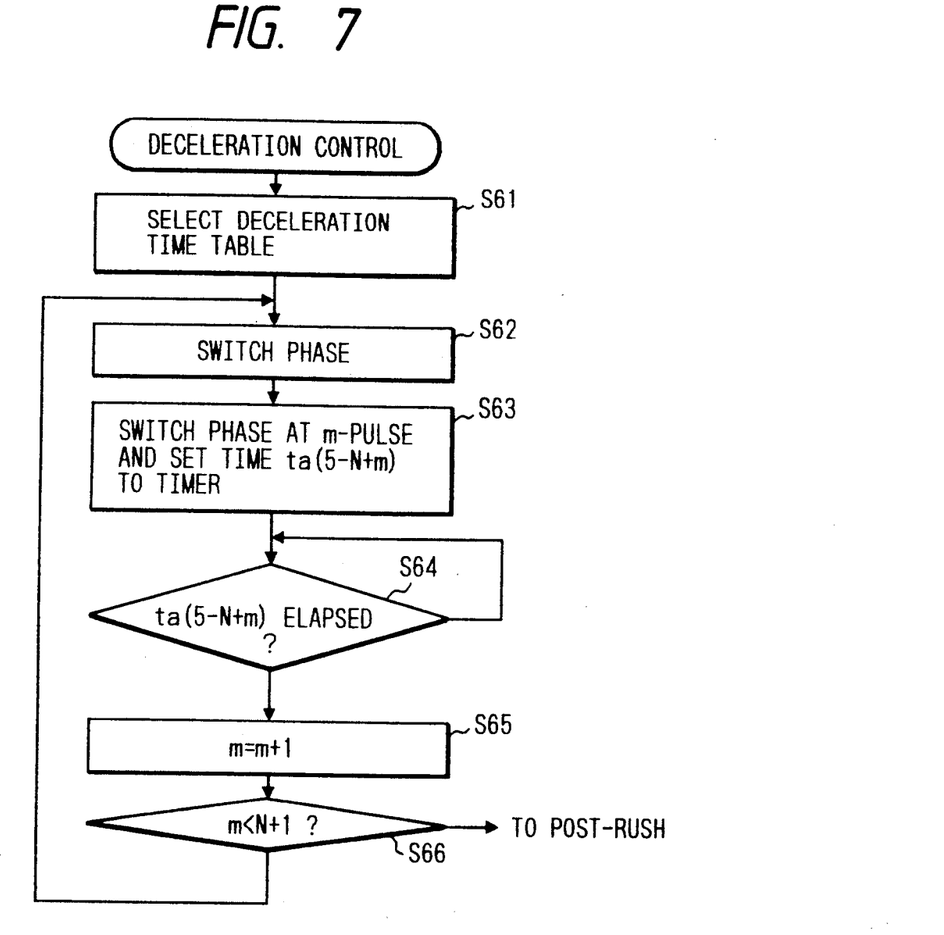
FIG. 7 is a flowchart showing the deceleration control operation of FIG. 4.

FIG. 7 illustrates the deceleration control operation (S14) in detail.

During the operation, CPU 23 accesses a deceleration time table within the ROM 21 (S61). The deceleration time table is shown in Table 4 (below). In the deceleration time table, the possible current voltages V at the end of the speed change control operation (i.e., at the start of the deceleration control operation) are divided into four ranges with the time intervals ta (1) to ta (5) corresponding to the five stages performed during the deceleration control operation. In Step S61, one of the time intervals ta (1) to ta (5) corresponding to the current voltage V finally obtained in Step S46 is selected.

TABLE 4

| Output voltage at speed change control end (V) | $V_s \leq 28$ | $28 < V_s \leq 33$ | $33 < V_s \leq 38$ | $38 < V_s$ |
| --- | --- | --- | --- | --- |
| ta (1) | 3.30 | 2.90 | 2.50 | 1.70 |
| ta (2) | 3.30 | 3.10 | 2.70 | 2.30 |
| ta (3) | 4.10 | 3.70 | 3.70 | 3.30 |
| ta (4) | 4.10 | 4.10 | 3.70 | 3.70 |
| ta (5) | 4.10 | 4.10 | 4.10 | 4.10 |

The time intervals ta (1) to ta (5) in each range of the deceleration time table are determined prior to operation of the printer in the following fashion. Since restoration of the output voltage during deceleration control is negligible, the output voltage during the deceleration control operation can be deemed equal to the current voltage V at the end of the speed change control operation. At the start of the deceleration control operation, i.e., at the end of the speed change control operation, the speed of the sheet feeding motor 5 differs depending on the actual voltage at that time. Therefore, the deceleration control operation requires that the sheet feeding motor 5 be decelerated so as to be within five stages from the end of the speed change operation. The time intervals ta (1) to ta (5) are determined as degrees to which the motor 5 is to be decelerated to implement such deceleration. It should be noted that the time intervals ta (1) to ta (5) may be alternatively set by dividing the possible current voltages V every 1 V also in the deceleration time table; however, the four-range divisions used above in the preferred embodiment is practical and satisfactory.

When one of the time intervals ta (1) to ta (5) is read in Step S61, the CPU 23 switches the frequency of the driving pulse signal for the sheet feeding motor 5 (S62), while simultaneously setting the timer to a time interval ta (5−N+m) for an mth step (S63). The CPU 23 then checks whether or not the time interval ta (5−N+m) has elapsed (S64). If the answer is affirmative, the stage count m is incremented (S65). Then, CPU 23 checks whether or not the stage count m has reached a step number N+1, which occurs at the end of the sheet feeding operation (S66), and if not, the CPU 23 repeats the steps from S62 to S66. The frequency of the driving pulse signal for the sheet feeding motor 5 is changed in accordance with the read time intervals ta (1) to ta (5), thereby decelerating the sheet feeding motor 5.

When the step count m has reached the sheet feeding end step number N+1, the CPU starts the post-rush and then terminates the sheet feeding operation.

As described above, the time intervals at the respective periods during sheet feeding are determined based on the data read from the table, with no actual secondary voltage being detected for every frequency change. While the conventional method that involves voltage detection for every frequency change requires complicated processing for averaging the values obtained by repeating the detection to eliminate inaccurate voltage readings due to spikes, no such cumbersome processing is required in the present invention.

As described in the foregoing pages, the invention is characterized as determining the time interval between pulses of a driving pulse signal corresponding to each step of the sheet feeding motor with such a simple operation as reading data from a table stored in a memory and not involving complicated calculation. As a result, the load of the CPU is kept to minimum so that high-speed processing can be attained.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A sheet feeding motor controller for use in a printer, the controller for controlling a driving signal used to drive a motor in accordance with the level of a printer power supply voltage within the printer, the controller comprising:

means for detecting a power supply voltage;

a first memory device for storing information representing a characteristic voltage restoration curve of the printer power supply;

a second memory device for storing information representing the relationship between a rotational speed of the motor and a plurality of voltages making up the characteristic printer power supply restoration curve;

means for estimating a current power supply voltage on the characteristic restoration curve from the information stored in said first memory device;

means for reading a rotational speed from said second memory device corresponding to the current power supply voltage estimated by said estimating means; and means for changing the speed of the motor in accordance with the read rotational speed.

2. A controller according to claim 1, wherein said changing means is a motor drive circuit outputting a driving signal at different frequencies in accordance with the rotational speed information read from said second memory device, said rotational speed information representing the frequency of the driving signal required to drive the motor at the read rotational speed.

3. A controller according to claim 2, wherein the motor is a sheet feeding motor for use during a sheet feeding operation of the printer, and wherein said motor drive circuit outputs a plurality of pulses as the driving pulse signal, the pulses being output at different time intervals in accordance with the rotational speed information read from said second memory device, said rotational speed information representing the time interval between pulses for the driving signal as required to drive the motor at the read rotational speed, thereby achieving a predetermined amount of motor torque of the sheet feeding motor for use during the sheet feeding operation.

4. A controller according to claim 3, further comprising:

means for detecting a no-load power supply voltage corresponding to a condition where the power supply is not loaded by the printer;

means for estimating a power supply voltage at a restoration completion time from the detected no-load power supply voltage, wherein the restoration completion time is a time at which the power supply voltage has been restored during the sheet feeding operation; and wherein said first memory device stores time intervals required for restoring the power supply voltage by a predetermined increment from the current power supply voltage, the time intervals corresponding to various voltage differences between the power supply voltage at the restoration completion time and the current power supply voltage; and wherein said means for estimating the current power supply voltage is comprises:

means for using the voltage detected at the beginning of a sheet feeding operation as an initially estimated current power supply voltage;

means for calculating a voltage difference between the estimated current power supply voltage and the power supply voltage at a restoration completion time and reading the required restoration time interval corresponding to the voltage difference from said first memory device;

means for detecting elapse of the read required restoration time interval based on the measured time; and means for updating the estimated current power supply voltage with a value to which the voltage increment is added when the elapse of the required restoration time has been detected.

5. A controller according to claim 3, further comprising:

a third memory device for storing time intervals for a predetermined step number n1 for accelerating the motor; and a fourth memory device for storing time intervals for a predetermined step number n2 for decelerating the motor;

wherein said changing means carries out frequency changes of the driving signal for the step number n1 in accordance with the time intervals read from the third memory device during the sheet feeding operation, and wherein when a sheet feeding amount is equal to a step number N, said changing means carries out frequency changing of the driving signal for the step number N-n1-n2 in accordance with the time intervals read from said second memory device, and carries out frequency changes for the step number n2 in accordance with the time intervals read from said fourth memory device.

6. A controller according to claim 5, wherein said third memory device stores time intervals for the step number n1 for a predetermined acceleration, the time intervals corresponding to respective power supply voltages at the beginning of the sheet feeding operation;

wherein said fourth memory device stores time intervals for the step number n2 for a predetermined deceleration, the time intervals corresponding to respective current power supply voltages; and wherein said changing means reads from said third memory device a time interval corresponding to the detected power supply voltage at the beginning of the sheet feeding operation and from said fourth memory device a time interval corresponding to the last estimated current power supply voltage.

* * * * *